United States Patent [19]
Wakita et al.

[11] Patent Number: 5,574,593
[45] Date of Patent: Nov. 12, 1996

[54] LIQUID CRYSTAL DISPLAY ELEMENT AND LAMINATED RETARDATION FILM APPLIED THERETO

[75] Inventors: Naohide Wakita, Osaka; Hisanori Yamaguchi, Neyagawa, both of Japan

[73] Assignee: Matsushita Electric Industrial Co., Ltd., Osaka, Japan

[21] Appl. No.: 440,129

[22] Filed: May 12, 1995

[30] Foreign Application Priority Data

May 18, 1994 [JP] Japan .................................... 6-103837

[51] Int. Cl.⁶ .............................. G02F 1/03; G02F 1/137
[52] U.S. Cl. ............................... 359/259; 359/53; 359/96; 359/93
[58] Field of Search .............................. 359/73, 102, 53, 359/55, 96, 93, 253

[56] References Cited

U.S. PATENT DOCUMENTS

| | | |
|---|---|---|
| 4,556,286 | 12/1985 | Uchida et al. |
| 5,212,819 | 5/1993 | Wada. |
| 5,303,075 | 4/1994 | Wada et al. |

OTHER PUBLICATIONS

Cole et al., *A new reflective dichroic Liquid–crystal display device*, Applied Physics Letters, vol. 30 No. 12, Jun. 1977.
Fujimura et al., *Optical Properties of Retardation Films for STN–LCDs*, SID 91 Digest, pp. 739–742, 1991.
Mitsui et al., *Late–News Paper: Bright Reflective Multicolor LCDs Addressed by a–Si TFTs*, SID 92 Digest, pp. 437–440, 1992.

*Primary Examiner*—Mark Hellner
*Attorney, Agent, or Firm*—Fish & Richardson P.C.

[57] ABSTRACT

A bright reflective liquid-crystal display element with high contrast which does not require a polarizer is provided together with a laminated retardation film applied thereto. Row electrodes are formed on the surface of an upper substrate, and on the surface of a lower substrate, a column electrode is formed. On top of the row electrodes and the column electrode, an alignment film is printed, and both substrates are subject to rubbing process from the right side of the paper face to the left side. Then, these substrates are joined together to form a blank cell. Chiral nematic liquid crystals are made by mixing a trace of chiral dopant to nematic liquid crystals, and 1% of black dichroic dye made by mixing a several colors of anthraquinone dichroic dye is dissolved in the chiral nematic liquid crystals to form guest host liquid crystals. The gest host liquid crystals are injected into the blank cell, thereby forming a liquid crystal panel. Under the liquid crystal panel, a retardation film is positioned, which is a quarter wavelength plate giving retardation of 140 nm against incident light with the wavelength of 550 nm. Then, a reflection plate is positioned under the retardation film.

11 Claims, 6 Drawing Sheets

(PRIOR ART)

LIQUID CRYSTAL DISPLAY ELEMENT AND LAMINATED RETARDATION FILM APPLIED THERETO

FIELD OF THE INVENTION

This invention relates to a bright reflective liquid crystal display element which uses guest host liquid crystals but is not equiped with a polarizer, and a laminated retardation film applied thereto.

BACKGROUND OF THE INVENTION

Display elements using nematic liquid crystals have several modes of aligning liquid crystal molecules. The twisted nematic (TN) mode is most widely used, but there are other modes such as the birefringence modes with a homeotropic (vertical) alignment or a homogenous (plane) alignment, and the guest host LC mode etc.

The TN liquid crystals are in a stable condition when nematic liquid crystals provided with positive dielectric anisotropy are placed between substrates which are planely aligned and disposed with electrodes, and a liquid crystal molecular long axis is successively twisted between the substrates at 90°. In this case, linearly polarized light enters vertically to the substrate, and a polarization plane of the linearly polarized light is rotated along the alignment of liquid crystals at 90°. Therefore, when polarizers and analyzers are disposed perpendicular to each other, the display becomes white. Furthermore, when liquid crystal molecules vertically align under applied voltage, incident linearly polarized light proceeds further into the liquid crystal layer, so the diplay becomes black due to absorption by the analyzers.

Since liquid crystal display elements in the TN mode or in the birefringence mode require a polarizer, the polarized light is absorbed in natural light. Therefore, transmissivity would not be more than 50% even under ideal conditions, and it is usually about 20 to 30%. As a result, particularly when reflective liquid crystals utilizing outer light are used, the display turns out to be extremely dark.

Figure 4A:
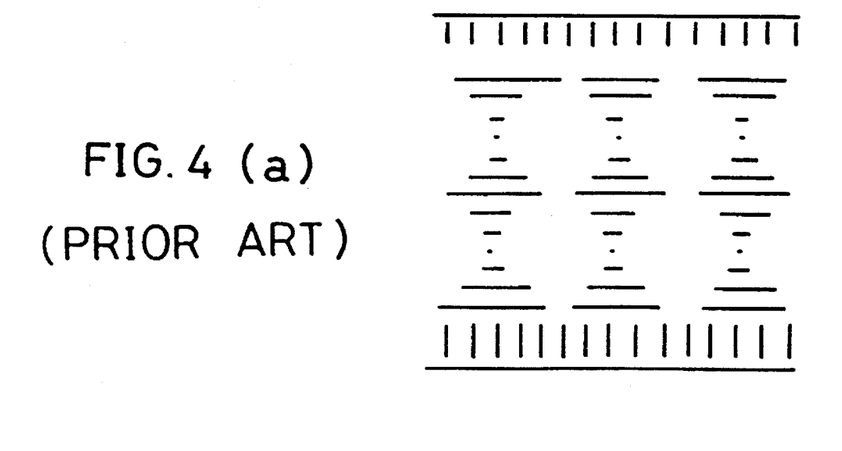

An example of a bright mode which does not use a polarizer is a phase change guest host LC mode shown in FIG. 4. At present, this mode is most intensively developed due to its brightness and high contrast. Furthermore, this mode is used to experimentally manufacture a reflective multicolor TFT-liquid crystal display panel (for example, S. Mitsui, Y. Shimada et al., SID'92, pp 437–440). By sandwiching guest host liquid crystals, which are made by mixing a dichroic dye and cholesteric liquid crystals having a comparatively short twist pitch between substrates, twist spirals are aligned in the vertical direction to the substrate.

Figure 4B:
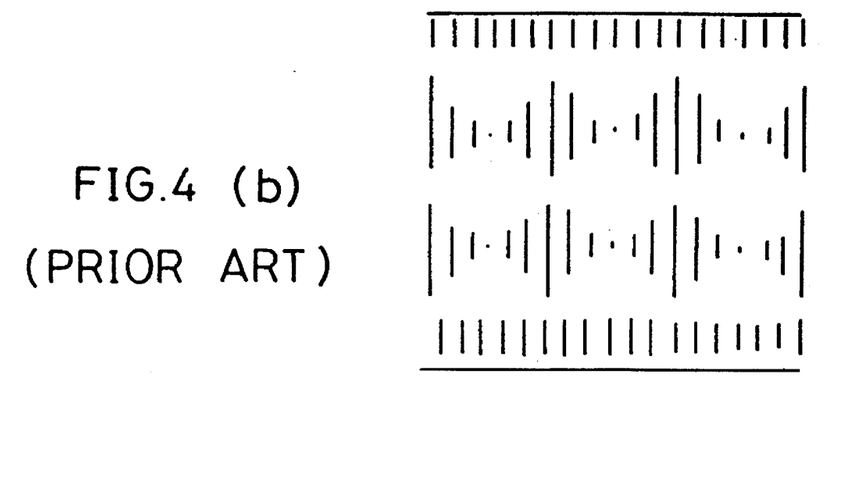
Figure 4C:
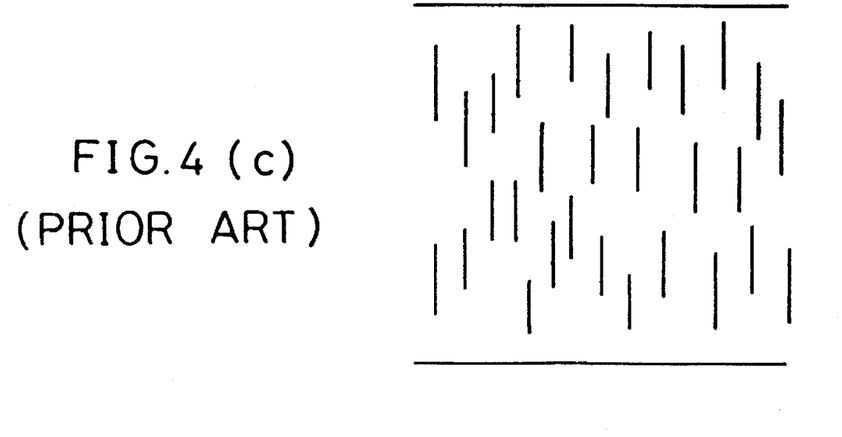

In this instance, incident light is absorbed into the dye, so that when, for example, black dye is used, the display would be black. The dichroic dye has an absorbance axis along a long axis direction of liquid crystal molecules, so that absorbance becomes higher when the incident linearly polarized light is not rotated optically by the liquid crystal molecules. Therefore, host liquid crystals having as small birefringence index ($\Delta n$) as possible are used. When voltage is applied to these liquid crystals, the screw axes first become horizontal to the substrate as shown in FIG. 4 (b). When voltage is applied further, the twists become loose, and the vertical alignment shown in FIG. 4 (c) is attained. In this case, the absorbance of the dye is small, so that the color of the reflection plate on the backside looks brighter.

The guest host liquid crystals are characterized in that as a result of enlarging cell thickness d or increasing dye concentration, contrast increases but the brightness detererorates. A logarithmic ratio of transmissivity (or reflectance) between the dark condition and the bright condition is called a "dichroic ratio", which serves as an index of performance for the guest host liquid crystals. As the dichroic ratio becomes larger, it is possible to obtain a display with more brightness and higher contrast. In order to enhance the dichroic ratio in the phase change guest host LC mode, it is effective not only to decrease the biregringence index $\Delta n$, but also to increase the ratio $d/p$ of the cell thickness d and the twist pitch p of the liquid crystals. However, the harmful effect of increasing $d/p$ is that the driving voltage becomes proportionally higher.

A value of generally used $d/p$ is about 2, and the driving voltage is as high as around 10 V, which is more than twice as much as that of the TN mode. Furthermore, threshold voltage at the time of raising the voltage and dropping the votage differs, so hysteresis results. Therefore, it is difficult to display half tone. In addition, the guest host liquid crystals are not suitable for matrix driving, since the intermediate condition of changing the direction of screw axes occurs between the condition of non-voltage and the condition of saturation.

Figure 5:
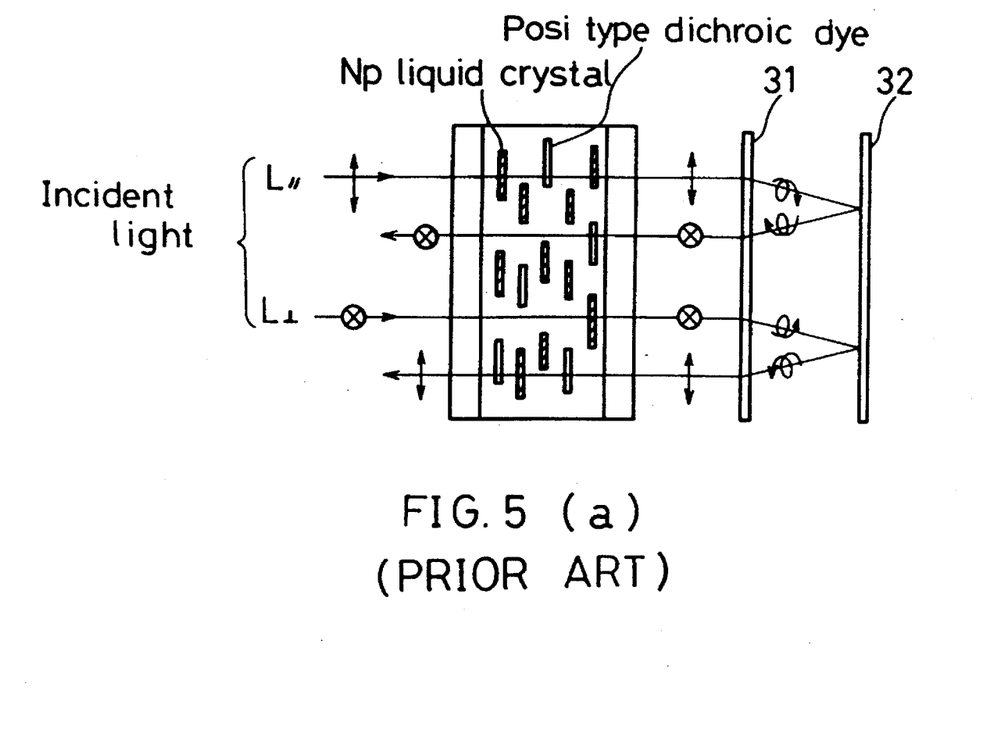

An another mode which does not use a polarizer is a mode shown in FIG. 5, in which a quarter wavelength plate 31 and a reflection plate 32 are positioned behind guest host liquid crystals having homogenous (vertical) alignment (for example, Applied Physics Letters, Vol. 30, No. 12, pp 619, H. S. Cole and R. A. Kashnow (1977)). Under the condition of non-voltage, incident polarized light which is parallel to planely aligned liquid crystal molecules is absorbed into the dye on the way. Furthermore, linearly polarized light which is perpendicular to planely aligned liquid crystal molecules passes through a liquid crystal layer and is then converted to circularly polarized light by passage through the quarter wavelength plate 31 on the way, which is reflected by the reflection plate 32 and turns into circularly polarized light turning in the reverse direction. The linearly polarized light which is perpendicular to planely aligned liquid crystal molecules has its phase shifted at a ½ wavelength by passage through the quarter wavelength plate 31 on the way back, so that the linearly polarized light reenters the liquid crystal layer after being converted to linearly polarized light parallel to the liquid crystal molecules and then absorbed into the dichroic dye inside the liquid crystals. Therefore, the display becomes darker. On the other hand, when voltage is applied, the alignment will be vertical as shown in FIG. 5 (b), so that light absorption in the liquid crystal layer is reduced. As a result, the display becomes brighter.

However, the above-mentioned conventional system using the quarter wavelength plate was impractical because of its extremely low contrast. The reason for the low contrast is that retardation differs depending on the incident angle of the light, so that the light, which passed through the quarter wavelength plate back and forth, is not converted completely to linearly polarized light, and hence components arise which are not absorbed into dyes on the way back. In other words, polarized light in the light parallel to the liquid crystal molecular long axis is absorbed into a dichroic dye. Polarized light perpendicular to the liquid crystal molecular long axis passes through a liquid crystal layer and then enters a retardation film. A usual quarter wavelength plate is used as a retardation film, and $n_p$ is determined to be a principal refraction index in the slow axis direction forming an angle of 45° with the polarized light, and $n_x$ is determined to be a principal refraction index in the fast axis direction perpendicular to this slow axis. Retardation of the polarized light which enters the plane including the liquid crystal molecular long axis and the substrate normal at an incident angle θ after passing through the liquid crystal layer can be described by a product of birefringence, which becomes smaller in accordance to the incident angle θ, and a distance, which becomes greater in accordance to the incident angle θ. This can be shown as Formula 1 below.

Formula 1

$$\{n_p n_s/(n_p^2 \sin^2 \theta + n_s^2 \cos^2 \theta)^{1/2} - n_s\} d/\lambda \cos \theta$$

The retardation shown in Formula 1, which approximately can be shown as the following formula (Formula 2), is reduced in proportion to cosθ as the incident angle θ increases.

Formula 2

$$(n_p - n_s) d \cos \theta / \lambda$$

On the other hand, birefringence in the plane including the liquid crystal molecular short axis and the substrate normal is not dependent on the angle, so that the retardation can be shown as the following formula (Formula 3), and the retardation increases rapidly in inverse propertion to cos θ when the incident angle θ increases.

Formula 3

$$(n_p - n_s) d / \lambda \cos \theta$$

In this way, for example, even if retardation of the retardation film is determined to become λ/4 when the incident angle θ is 0°, the retardation of the retardation film changes greatly even when the incident angle θ declines about 30°. Since light arises which is not absorbed into the dye on the way back, contrast is extremely deteriorated.

Furthermore, this system comprises liquid crystals with a homogeneous alignment, and steepness in threshold properties is insufficient, so that only a few pixels can perform matrix driving.

On the other hand, as a mode which is widely used at present, there is a super twisted nematic (STN) mode comprising the TN mode twisted even more. The STN mode also utilizes a retardation film. When STN liquid crystals are sandwiched between polarizers, birefringence color appears due to its short twist pitch. Then, according to the change in the amount of birefringence (retardation) caused by the voltage, the display changes its color. In order to eliminate coloration of the STN liquid crystals, the technology in using a retardation film made of a polymer has developed remarkably in recent years. Usually, for the purpose of eliminating the coloration resulting from birefringence of the STN liquid crystals, a polymer retardation film with a retardation of about 400 to 500 nm is used. However, when the retardation film used for eliminating the coloration has incident angle dependency, it causes the problem of display coloration etc. according to viewing angle, so that the following technique was proposed to solve this problem (for example, Y. Fujimura, T. Nagatuka, H. Yoshimi and T. Shimomura: SID' 91 Digest, 35.1 (1991)).

Against principal refractive indexes $n_p$, $n_s$ inside the plane of the retardation film ($n_p > n_s$, direction of $n_p$ is called a slow axis direction, and the direction of $n_s$ is referred to as fast axis direction), a principal refractive index $n_z$ in the thickness direction is usually equal to or smaller than $n_s$. When a liquid-crystal panel is observed from the front face, $n_z$ does not play a part, but when the liquid-crysal panel is observed perspectively, the component of $n_z$ also contributes to the amount of birefringence. From the direction corresponding to Formula 3 mentioned above, namely, from the direction in the plane including the liquid crystal molecule short axis and the substrate normal, the birefringence index at the perspective view decreases by allowing $n^z$ to be larger than $n_s$. Since the light passage is lengthened, the retardation change is reduced to counterbalance.

According to a simulation performed by Nagatuka et al. (supra), the incident angle dependency of retardation becomes minimum, provided that the relationship shown as Formula 4 below is satisfied.

Formula 4

$$n_z = (n_p + n_s)/2$$

A representative example of a retardation film which attains the relationship of the above-mentioned formula (Formula 4), is a three-dimentional reflective index control retardation film NRZ manufactured by Nitto Denko Corporation. In this retardation film NRZ, the principal refraction index $n_z$ in the thickness direction is also controlled by employing the stretching method of polycarbonate.

In addition, a retardation film satisfying Formula 4 mentioned above can be accomplished by connecting conventional retardation films having a positive and a negative birefringence index Δn.

SUMMARY OF THE INVENTION

It is an object of this invention to solve the above-mentioned problems in the conventional systems by providing a bright reflective liquid crystal display element with high contrast which does not require a polarizer. A further object of this invention is to provide a laminated retardation film applied to this reflective liquid crystal display element.

In order to accomplish these and other objects and advantages, a liquid-crystal display element of this invention comprises at least one liquid crystal layer comprised of guest host sandwiched between electrodes facing each other via an alignment film, a retardation film disposed under (behind) the liquid crystal layer, and a reflection plate disposed under (behind) the retardation film, wherein at the time when polarized light passing through the liquid crystal layer enters the retardation film and is reflected on the reflection plate and is radiated once more from the retardation film, retardation of the retardation film is determined such that relative retardation of the polarized light shifts at 180°, and the principal refraction index in the thickness direction of the retardation film is determined to be a value obtained in the middle of two principal refraction indexes inside the plane.

It is preferable in the above-mentioned configuration of the liquid crystal display element of this invention that the retardation of the retardation film is about a quarter wavelength against light with a wavelength of 550 nm.

Furthermore, it is preferable in the above-mentioned configuration of the liquid crystal display element of this invention that the alignment film comprises a vertically aligned film, and the guest host liquid crystals are made by mixing a dichroic dye to nematic liquid crystals with negative dielectric anisotropy.

In addition, it is preferable in the above-mentioned configuration of the liquid crystal display element of this invention that the guest host liquid crystals have a twisted nematic structure of 180° to 250°, and a twist pitch of the twisted nematic structure is larger than Mauguin's limit. Also, it is preferable that the retardation film is a quarter wavelength plate, and that the birefringence of the retardation film has its principal axis in the direction forming an angle of 30° to 60° with an aligned direction of a liquid crystal molecule being closest to the retardation film of the liquid crystal layer.

It is preferable in the above-mentioned configuration of the liquid crystal display element of this invention that the retardation film comprises a material having smaller wavelength dispersion of retardation than polycarbonate. In this case, it is preferable that the retardation film comprises polyvinyl alcohol.

Next, a second embodiment of this invention is a laminated retardation film. The laminated retardation film is formed by joining a retardation film A having small wavelength dependency of refraction index on a retardation film B having large wavelength dependency of refraction index and smaller retardation than the retardation film A such that a slow axis of said retardation film B is approximately perpendicular to a slow axis of said retardation film A, wherein a refraction index $n_{zB}$ in the thickness direction of the retardation film B is determined to be larger than a refraction index $n_{pB}$ in the slow axis direction.

Furthermore, it is preferable in the above-mentioned configuration of the laminated retardation film of this invention that a product $(n_{zB}-n_{pB})\times d_B$ of a difference between the refraction index $n_{zB}$ in the thickness direction and the refraction index $n_{pB}$ in the slow axis direction of the retardation film B, and a thickness $d_B$ of the retardation film B is about half the retardation of the laminated retardation film. In this case, it is preferable that the retardation film A is comprised of polypropylene or polyvinyl alcohol, and the retardation film B is comprised of polycarbonate.

In addition, it is preferable in the above-mentioned configuration of the liquid crystal display element of this invention that the retardation film comprises a laminated retardation film formed by adhering a retardation film A having small wavelength dependency of refraction index on a retardation film B having large wavelength dependency of refraction index and smaller retardation than the retardation film A such that a slow axis of said retardation film B is approximately perpendicular to a slow axis of said retardation film A, wherein a refraction index $n_{zB}$ in the thickness direction of the retardation film B is determined to be larger than a refraction index $n_{pB}$ in the slow axis direction.

According to the configuration mentioned above, the liquid crystal display element of this invention comprises at least one liquid crystal layer composed of guest host liquid crystals being sandwiched between electrodes facing each other via an alignment film, a retardation film disposed under the liquid crystal layer, and a reflection plate disposed under the retardation film, wherein at the time polarized light passing through the liquid crystal layer enters the retardation film and is reflected on the reflection plate and is radiated back to the retardation film, retardation of the retardation film is determined such that relative retardation of the polarized light shifts at 180°, and a principal refraction index in the thickness direction of the retardation film is determined to be a value obtained in the middle of two principal refraction indexes inside the plane. Therefore, polarized light entering the retardation film from any direction is rotated at a ½ wavelength and reenters the liquid crystal layer as linearly polarized light perpendicular to the incident polarized light. Then, this linearly polarized light is rotated optically along a liquid crystal molecular long axis in the same manner as on the way, which is absorbed into a dichroic dye contained in the guest host liquid crystals. As a result, not only is reflected light eliminated, but the dichroic ratio also becomes larger. In this way, a bright display with high contrast can be attained.

As mentioned above, when the retardation of the retardation film is about a quarter wavelength against light with a wavelength of 550 nm, polarized light entering the retardation film from any direction can be rotated at a ½ wavelength in light with a wavelength of 550 nm.

Furthermore, according to the preferable configuration of the liquid crystal display element of this invention, the alignment film comprises a vertically alignment film, and the guest host liquid crystals are made by mixing a dichroic dye to nematic liquid crystals with negative dielectric anisotropy. In this way, a dichroic ratio can be enhanced even more.

In addition, it is preferable in the liquid crystal display element of this invention that the guest host liquid crystals have a twisted nematic structure of 180° to 250°, and a twist pitch of the twisted nematic structure is larger than Mauguin's limit. As a result, the steepness of threshold properties can be improved to enable matrix driving. Also in this case, it is preferable that the retardation film is a quarter wavelength plate, and that birefringence of the retardation film has its principal axis in the direction forming an angle of 30° to 60° with an aligned direction of a liquid crystal molecule being closest to the retardation film of the liquid crystal layer. In this way, a display with high contrast can be attained.

Also, when the retardation film comprises a material having smaller wavelength dispersion of retardation than polycarbonate, a display with reduced coloration can be attained, and the contrast can be enhanced. In this case, when the retardation film comprises polyvinyl alcohol, wavelength dispersion of retardation becomes smaller than that of polycarbonate.

The second embodiment of this invention is characterized in that the laminated retardation film is formed by adhering a retardation film A having small wavelength dependency of refraction index on a retardation film B having large wavelength dependency of refraction index and smaller retardation than the retardation film A such that a slow axis of the retardation film B is approximately perpendicular to a slow axis of the retardation film A, wherein a refraction index $n_{zB}$ in the thickness direction of the retardation film B is determined to be larger than a refraction index $n_{pB}$ in the slow axis direction. Accordingly, it is possible to attain a laminated retardation film, in which retardation increases monotoneously in proportion to the wavelength, while compensating the incident angle dependency of retardation. Thus, reflected light can be eliminated in all the wavelengthes, and not only can the display with coloration be reduced, but the contrast is also enhanced even more.

Furthermore, it is preferable in the above-mentioned configuration of the laminated retardation film of this invention that a product $(n_{zB}-n_{pB})\times d_B$ of a difference between the refraction index $n_{zB}$ in the thickness direction and the refraction index $n_{pB}$ in the slow axis direction of the retardation film B, and a thickness $d_B$ of the retardation film B is about half the retardation of the laminated retardation film. As a result, the incident angle dependency of retardation becomes even smaller.

BRIEF DESCRIPTION OF THE DRAWINGS

FIG. 4 (a) to 4 (c) are cross-sectional views showing a conventional example of a liquid crystal display element.

FIG. 5 (a) and 5 (b) are cross-sectional views showing another conventional example of a liquid crystal display element.

DETAILED DESCRIPTION OF THE INVENTION

This invention will be described by referring to the following illustrative examples and attached figures. The examples are merely illustrative and are not intended to limit the invention in any way.

Conventionally, the phase change guest host LC mode has been developed as the most suitable reflective color liquid crystals which have brightness and a high dichroic ratio serving as an index of contrast. On the other hand, the liquid crystal display element of this invention is accomplished by combining the guest host LC mode using a quarter wavelength plate and a retardation film being deprived of incident angle dependency. In this way, a display having a 20% more dichroic ratio can be obtained as compared with a conventional display.

As a retardation film for the STN, a film with retardation of around 400 nm is generally used, but it is also possible to manufacture a film with smaller retardation. Even if the incident angle is changed, by minimizing retardation of a retardation film having extremely small retardation change to about $\lambda/4$, and by positioning this retardation film under the guest host liquid crystals, contrast, which is very low in a conventional quarter wavelength plate, can be enhanced remarkably.

Furthermore, the conventional guest host liquid crystals were employed a homogeneous alignment, so that the steepness of the threshold properties can not be obtained, and therefore, they were unsuitable for matrix driving. As already indicated by the STN liquid crystals, the steepness of the threshold properties can be improved by providing a twisted alignment. In case of the STN liquid crystals, however, it is twisted such that the incident linearly polarized light is converted to elliptically polarized light by birefringence, and under these conditions, absorbance by dye will decrease. However, by fulfilling the conditions of Mauguin's limit, in which the twisted alignment serves as a light guide, the plane of incident linearly polarized light is optically rotated along the liquid crystal molecular long axis, so that the same level of absorbance as that with homogeneous alignment can be obtained. Here, the conditions of Mauguin's limit can be described as Formula 5 below, in which $\Delta n$ represents birefringence of liquid crystals; p represents a twist pitch; and $\lambda$ represents the wavelength of the incident light.

Formula 5

$$p > 8\lambda/\Delta n \ (p \gg \lambda/\Delta n)$$

Example 1

Figure 1:
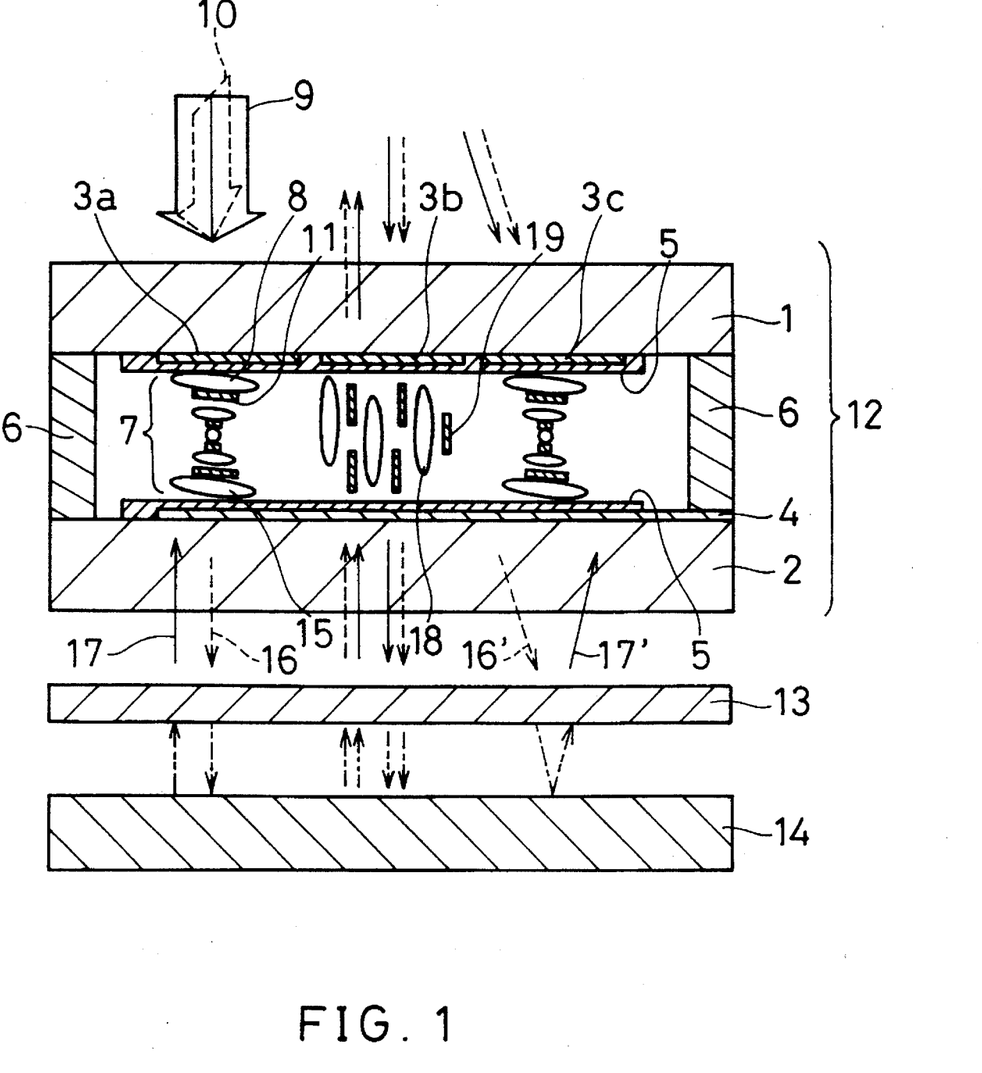
FIG. 1 is a cross-sectional view showing a first embodiment of a liquid crystal display element in this invention.

FIG. 1 is a cross-sectional view showing one embodiment of a liquid crystal display element of this invention. As shown in FIG. 1, row electrodes 3a, 3b, and 3c composed of, for example, indium tin oxide are formed on the surface of an upper substrate 1 made of, for example, glass. Furthermore, on the surface of a lower substrate 2 also made of glass, a column electrode 4 composed of, for example, indium tin oxide is formed. In addition, covering the row electrodes 3a, 3b, 3c, and on top of the column electrode 4, a polyimide alignment film 5 is formed by a printing method, and both substrates are subject to rubbing process from the right side of the paper face to the left side. Then, these substrates are attached to each other by means of a spherical spacer at an interval of 12 μm, and a seel resin 6 is applied in the circumference. In this way, a blank cell is formed.

Next, chiral nematic liquid crystals with a pitch of 24 μm were made by mixing a trace of chiral dopant S-811 to nematic liquid crystals E-8 ($\Delta n$=0.23) (both manufactured by BDH Co. ) Then, 1% of black dichroic dye 11 made by mixing a several colors of anthraquinone dichroic dye was dissolved in the chiral nematic liquid crystals to form guest host liquid crystals. The guest host liquid crystals were injected into the blank cell mentioned above, thereby forming a liquid crystal panel 12.

When the liquid crystal panel 12 was formed in the above-mentioned method, the liquid crystals were twisted inside the cell at 180°, so that a super twisted nematic structure 7 was attained. When this cell was observed by means of a transmission polarization microscope, it was confirmed that polarized light 9, which is parallel to a long axis of a liquid crystal molecule 8 disposed on the surface of the upper substrate 1, was absorbed, whereas polarized light 10, which is vertical to the long axis of the liquid crystal molecule 8, passed through. In other words, all the incident linearly polarized light was optically rotated along the twist, and one was absorbed into a dichroic dye 11, and the other was hardly absorbed and proceeded further in the way shown as arrows 16, 16' in broken line. A constant of this liquid crystal panel 12 was applied to the conditional expression of the Mauguin's limit shown as Formula 5 above. It was confirmed that it corresponds to the experimental values, since almost all the visible light with a wavelength as long as 690 nm satisfy the above-mentioned Formula 5 because the twist pitch p is 24 μm, and the birefringence $\Delta n$ is 0.23. In the phase change guest host LC mode, the birefringence of the liquid crystals was preferably small, but as for the liquid crystal display element in this embodiment, the birefringence of the liquid crystals was increased to increase response speed, so that the Mauguin's limit was exceeded even if the liquid crystal layer was thin.

A retardation film 13 which is a quarter wavelength plate NRZ manufactured by Nitto Denko Corporation was disposed under the liquid crystal panel 12, which provides retardation of 140 nm against incident light with the wavelength of 550 nm. Furthermore, a diffusion aluminum reflection plate 14 is disposed underneath the retardation film 13. The stretching direction (main axis direction of birefringence) of the retardation film 13 is directed to the direction forming an angle of 45° against a long axis (alignment direction) of a liquid crystal molecule 15 placed on top of the lower substrate 2. The product of the difference between a principal refraction index $n_p$ in this direction and a principal refraction index $n_s$ perpendicular to this direction inside the plane, and the thickness d of the retardaton film 13 is 140 nm. The product of the difference between $n_s$, $n_p$ and a principal refraction index $n_z$ in the thickness direction, and the thickness d of the retardation film 13 is 70 nm.

Accordingly, when the light has the wavelength of 550 nm, polarized light which enters the retardation film 13 from any direction of about ±50° is rotated at a half wavelength and reenters the liquid crystal layer as linearly polarized light 17, 17' perpendicular to the incident polarized light. Then, this linearly polarized light 17, 17' is optically rotated along the liquid crystal molecule long axis in the same manner as on the way, and the light is absorbed into the dichroic dye 11. As a result, reflected light is eliminated.

However, when the material comprising the retardation film is polycarbonate, wavelength dispersion (wavelength dependency) of retardation is relatively large, and blue wavelength particularly has a large amount of birefringence $\Delta nd/\lambda$, so that a lot of light components are not absorbed, and the display becomes slightly blue. As a retardation film for eliminating coloration in the STN mode, it is possible to attain higher contrast by adjusting to the wavelength dispersion of birefringence of the liquid crystal molecule, so that polycarbonate having large wavelength dispersion of retardation was suitable. In this invention, however, it is more suitable to use polyvinyl alcohol having small wavelength dispersion of retardation to reduce the coloration of the display and to enhance the contrast.

When a rectangular wave of 2.5 V, 60 Hz is applied between the electrodes of this liquid crystal display element, a liquid crystal molecule 18 and a dichroic dye 19 in FIG. 1 are both aligned vertically. Therefore, absorbance of the dye deteriorates, and the display becomes bright. The contrast at the bright and dark parts was measured by means of a luminance meter under the lumination of usual dome light, and the result was about 8:1.

For the purpose of comparison, contrast was measured by disposing a usual quarter wavelength plate, which is the same with the conventional system, and a reflection plate behind the same liquid crystal panel, and the result was about 2.3.

Furthermore, when the liquid crystal panel of this embodiment was subject to matrix driving by a generally used mean voltage selection addressing scheme, a contrast of 4.5 was obtained at a duty ratio of 1/32. Here, the limit was a duty ratio of about 1/4 with a homogenous alignment. In addition, by providing intermediate effective voltage by pulse duration modulation, it was also easy to display gradation.

Provided that the twist of the liquid crystals is greater than 180° of this embodiment and less than 250°, the steepness of the threshold properties is improved even more, and the number of pixels capable of matrix driving is increased. However, also in this case, since the twist pitch of more than the Mauguin's limit must be maintained, the thickness of the cell becomes greater when the same liquid crystals are used. Furthermore, this thickness of the cell is greater than the usual STN liquid crystals, so that the response speed would be considerably slow. When the twist of the liquid crystals is 180°, the response speed is very fast as a super twisted alignment, and the steepness of the threshold properties can be also maintained to some degree at the time of matrix driving. This would result in an optimally balanced condition.

In addition, a quarter wavelength plate, for example, NRZ manufactured by Nitto Denko Corporation can be used in this embodiment as the retardation film 13, and the retardation film is not necessarily restricted to this type only. Any retardation film, particularly one in which reflected polarized light rotates at a half wavelength, is suitable. Furthermore, a method of compensating the incident angle dependency and the retardation are not restricted to the examples described in this embodiment. For example, by adhering a negative retardation film with retardation of −70 nm on an ordinary uniaxial retardation film with retardation of 70 nm, the incident angle dependency of retardation becomes smaller, so the contrast is enhanced compared with the conventional type.

In a black & white display, it is desirable to use a wavelength of 550 nm which has the highest spectral luminance efficacy as a reference wavelength for the quarter wavelength plate. In a color display, however, it is necessary to adjust the wavelength to the wavelength of the displayed color.

Also in this embodiment, the crossed axes angle formed by the long axis (alignment direction) of the liquid crystal molecule 15 disposed on the surface of the lower substrate 2 and the stretched axis (main axis of birefringence) of the retardation film 13 is determined to be 45°, but it is not necessarily restricted to this angle only. When the angle is in the range of 30° to 60°, the dark condition becomes considerably dark, so that a display with high contrast can be attained.

Example 2

In the above-mentioned Example 1, the alignment was twisted at 180° by using a planely alignment film for enabling matrix driving with a large number of lines. The steepness of the threshold properties would not be a problem when a display panel provided with a small number of pixels is used. Therefore, the alignment condition which can enhance a dichroic ratio was examined. As a result, it became clear that the dichroic ratio can be enhanced even more by using a vertically alignment film as an alignment film, and also by using nematic liquid crystals having negative dielectric anisotropy as liquid crystals. This is due to the fact that since the planely alignment film has a strong constraining force, the liquid crystal molecules near the alignment film and the dichroic dye molecules do not move even if voltage is applied, so the display becomes slightly darker. On the other hand, the vertically alignment film has a very weak constraining force, so that the liquid crystal molecules near the alignment film can also respond, thereby obtaining a greater dichroic ratio.

Figure 2:
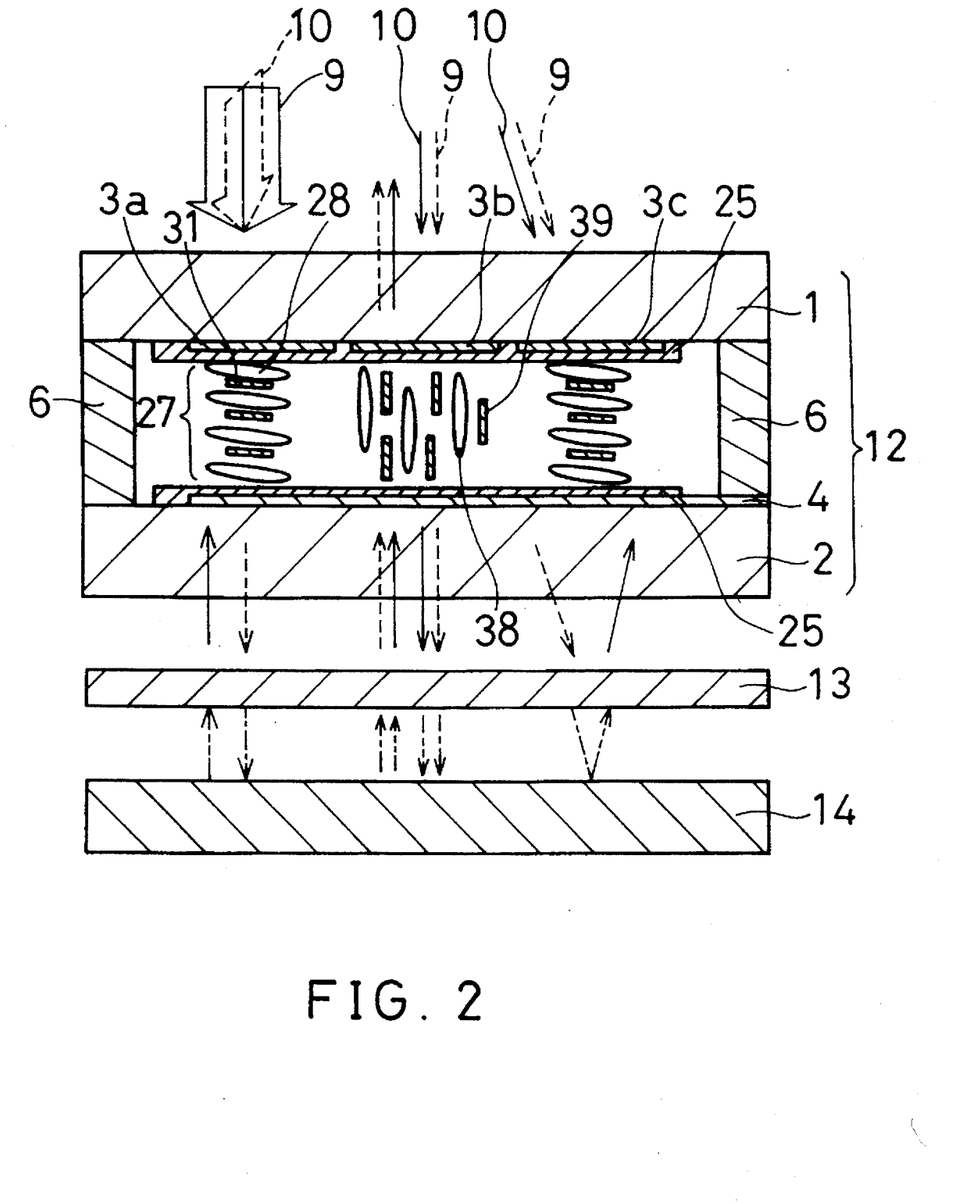
FIG. 2 is a cross-sectional view showing a second embodiment of a liquid crystal display element in this invention.

FIG. 2 is a cross-sectional view showing a second embodiment of a liquid crystal display element of this invention. The liquid crystals 27 were ZLI2806 manufactured by Merck Ltd. These crystals have a negative dielectric anisotropy. 2% of positive black dichroic dye, which absorbs light when molecules fall down, was dissolved in the crystals. As an alignment film 25, a polyimide-type vertically alignment film SE1211 manufactured by Nissan Chemical Industries, Ltd. was applied on both substrates.

The upper substrate was subject to a rubbing process in the right direction of the paper face, whereas the rubbing process was conducted in the left direction of the paper face for the lower substrate, so that the substrates become antiparallel. Then, these substrates were attached to each other by means of a spherical spacer at an interval of 5 μm. When the above-mentioned liquid crystals 27 were injected into a blank cell formed in this way, alignments 38, 39 were attained which decline from the substrate normal at several degrees. Under the condition of non-voltage, it is almost vertically aligned as shown here, so that it is not absorbed. On the other hand, when voltage is applied, the liquid crystal molecule 28 and dye molecule 31 fall down in the rubbing direction in approximately homogeneous (plane) alignment, and polarized light 9, which is parallel to the alignment direction, is absorbed.

In the same manner as in the first embodiment mentioned above, by disposing a retardation film 13, which is a quarter wavelength plate with the incident angle dependency being compensated, and a reflection plate 14 behind the cell, polarized light 10 which passed through on the way thereto is rotated at 180° at the time of being radiated again from the retardation film 13, and the polarized light 10 is absorbed on the way back.

As the retardation film 13, a quarter wavelength plate NRZ manufactured by Nitto Denko Corporation was used as in the above-mentioned first embodiment, with the result of 50% in the reflection rate and 15 in the contrast. When this is converted into a dichroic ratio, it is about 4.9.

For the purpose of comparison, the same dichroic dye was used to manufacture a phase change guest host LC panel, and the resulting contrast was about 9 when the reflection rate was 50%. When this is converted into a dichroic ratio, it is about 4.2. Accordingly, it is clear that the liquid crystal display element in this embodiment is about 1.5 times greater in contrast and about 18% higher in dichroic ratio. Furthermore, according to the configuration of the liquid crystal display element of this embodiment, it is also possible to display gradation, and the driving voltage can be as low as 5 V. Here, when a retardation film without the incident angle dependency being compensated was used as the quarter wavelength plate, the contrast resulted in an extremely low value of 4.5 when the reflection rate was 50%

When NZR is used as a retardation film, wavelength dependency of retardation is so great that the display is colored. When retardation in the film increases monotoneously in proportion to the wavelength, while compensating the incident angle dependency, reflected light can be eliminated in all the wavelengths. Not only can a display with reduced coloration be formed, but the contrast is also enhanced even more. The inventors of this invention obtained this retardation film by modifying a wide-band retardation film NZR manufactured by Nitto Denko Corporation. In this way, the liquid crystal display element in the above-mentioned first embodiment was improved even more.

Figure 6:
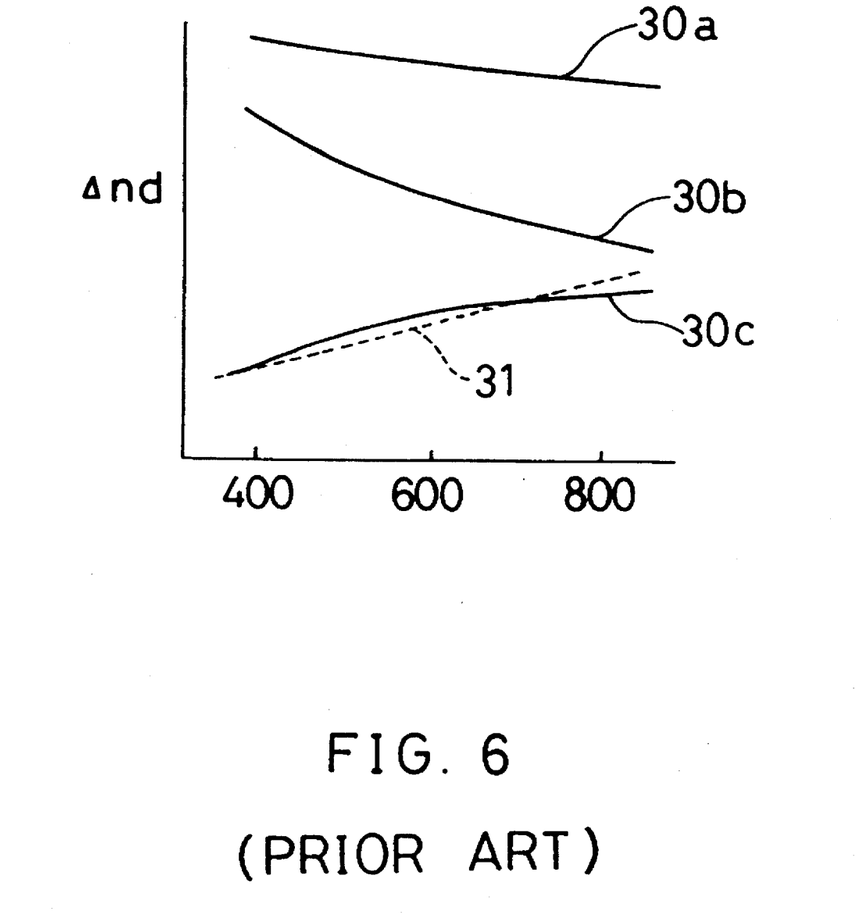
FIG. 6 is a diagram showing the properties of wavelength dependency of retardation in a conventional laminated retardation film.

First, it will be explained how the wavelength dependency is compensated in the wide-band retardation film. This wide-band retardation film is formed by placing a film a (e.g., polycarbonate) having large wavelength dependency of refraction index on top of a film b (e.g., polypropylene) having small wavelength dependency. FIG. 6 shows wavelength dependency of $\Delta nd$ in the films a and b. Full lines respectively 30a, 30b show retardation of the films a and b. Furthermore, the film b and the film a, which is thinner than the film b, are joined together perpendicular to the slow axis to form a laminated film, and a full line 30c shows $\Delta nd$ of this laminated film. In other words, the full line 30c indicates a difference between $\Delta nd$ of the film b and $\Delta nd$ of the film a, and draws a curve of steady increase.

In addition, a dotted straight line 31 shows retardation when it is $\Delta nd=\lambda/4$. It is clear that the full line 30c is close to this dotted straight line 31, and this full line 30c is close to the condition of $\Delta nd=\lambda/4$ for any wavelength. However, the incident angle dependency is not compensated in the conventional wide-band retardation film, so that the contrast deteriorated in comparison with using NRZ.

A first method of compensating the incident angle dependency of the laminated film such as the wide-band retardation film is to adjust the refraction index in the thickness direction such that each of the two types of films to be joined together satisfies the above-mentioned formula (Formula 4) for attaining smaller incident angle dependency. However, the fact is, some materials can not be adjusted so easily, and this method can lead to higher costs. Therefore, a laminated retardation film in this embodiment was formed by joining an ordinary polypropylene film and a polycarbonate film which has the refraction index $n_z$ in the thickness direction being increased.

Figure 3:
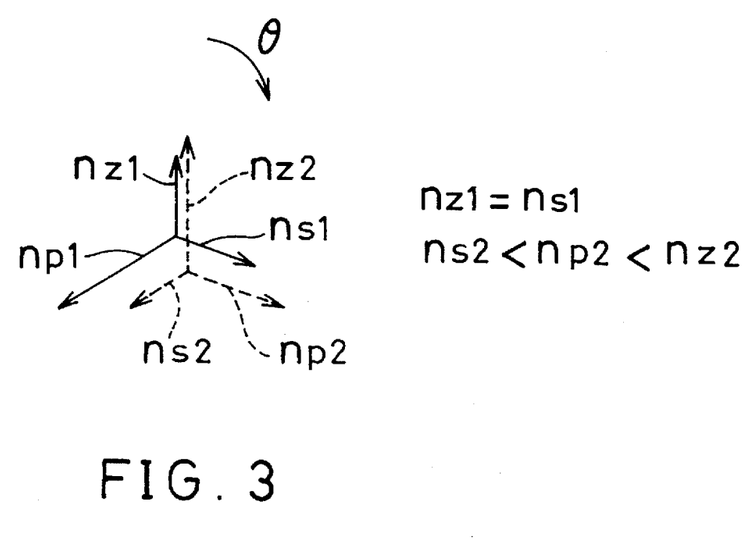
FIG. 3 is a conceptional view of a laminated retardation film of this invention.

FIG. 3 is a conceptual view showing a configuration of a laminated retardation film in this invention. In this figure, refraction indexes in the slow axis direction, fast axis direction, and thickness direction of the polypropylene film are represented as $n_{p1}$, $n_{s1}$, and $n_{z1}$, and the thickness of the polypropylene film is represented as $d_1$. Refraction indexes in the slow axis direction, fast axis direction, and thickness direction of the polycarbonate film are represented as $n_{p2}$, $n_{s2}$, and $n_{z2}$ respectively, and the thickness of the polycarbonate film is represented as $d_2$. As in conventional methods, the fast axis of the polypropylene film is placed perpendicularly to the fast axis of the polycarbonate film, but this embodiment is characterized in that the refraction index $n_{z2}$ in the thickness direction is determined to be larger than $n_{p2}$ in the slow axis direction of the polycarbonate film. This is due to the fact that the retardation of the polypropylene film becomes larger in inverse proportion to $\cos \theta$ according to the above-mentioned formula (Formula 3) when the incident angle $\theta$ becomes larger inside the plane including the refraction index $n_{s1}$ in the fast axis direction. However, provided that $n_{z2}=n_{p2}$, retardation of the polycarbonate film is in inverse proportion to $\cos \theta$, and the retardation of the entire laminated retardation film becomes greater in inverse proportion to $\cos\theta$, so that the incident angle dependency of the polycarbonate film becomes even more higher.

In case when $n_{z2}=n_{p2}$, the retardation of the laminated retardation film is described as the following formula (Formula 6), which hypothetically is the same with a monolayer quarter wavelength plate with the incident angle dependency being uncompensated.

Formula 6

$$(\lambda/4)/\cos \theta$$

Therefore, when the above-mentioned formula (Formula 4) is applied to adjust the incident angle dependency of this hypothetical monolayer quarter wavelength plate, it is anticipated that the incident angle dependency of retardation becomes minimum when it is designed to satisfy the relationship of the following formula (Formula 7).

Formula 7

$$n_{z2} \times d_2 = n_{p2} \times d_2 + \lambda/8$$

Formula 7 above indicates that the product $(n_{z2}-n_{p2}) \times d_2$ of the difference between the refraction index $n_{z2}$ in the thickness direction and the refraction index $n_{p2}$ in the slow axis direction of the polycarbonate film, and the thickness $d_2$ of the polycarbonate film is about half the retardation of the laminated retardation film. In fact, this was confirmed to be true when observed by changing the laminated retardation film $n_{z2}$ in FIG. 4. The laminated retardation film used in this embodiment had a birefringence $(n_{p1}-n_{s1}) d_1$ inside the plane of the polypropylene film with 605 nm, and $\Delta nd$ inside the plane of the polycarbonate film, namely, $(n_{p2}-n_{s2}) \times d_2$ with 465 nm, and $(n_{z2}-n_{s2}) \times d_2$ with 535 nm. Here the values of retardation are measured with light with a wavelength of 550 nm.

The laminated retardation film with the incident angle dependency and the wavelength dependency being compensated is used for a liquid crystal display element with the configuration shown in FIG. 2. As a result, the reflection rate under the condition of non-voltage was about 50%, and the contrast with 5 V being applied was about 20, so a black & white contrast display which is bright, of high contrast, and of achromatic color was attained. Furthermore, when this is converted into a dichroic ratio, it is 5.3. In other words, compared with the case of the phase change guest host liquid crystal panel, the contrast is twice as high, and the dichroic ratio increased as much as 26%. Here, although the laminated retardation film of this invention which can compensate both the incident angle dependency and the wavelength dependency is characterized in that the refraction index $n_{z2}$ in the thickness direction is higher than the refraction index $n_{p2}$ in the slow axis direction of the polycarbonate film having large wavelength dependency, the laminated retardation film as a whole satisfies the above-mentioned formula (Formula 4).

Namely, as mentioned above, it is $(n_{p1}-n_{s1})d_1=605$ nm, $n_{z1}=n_{s1}$, $(n_{p2}-n_{s2})d_2=465$ nm, and $(n_{z2}-n_{s2})=535$ nm. Thus, based on these relational expressions, average refraction indexes $N_p$, $N_s$, $N_z$ in the slow axis direction, fast axis direction, and thickness direction of the laminated retardaton film can be described as the following formulas (Formula 8 to Formula 10).

Formula 8

$$N_p=(n_{p1}d_1+n_{s2}d_2)/(d_1+d_2)$$

Formula 9

$$N_s=(n_{s1}d_1+n_{p2}d_2)/(d_1+d_2)$$

Formula 10

$$N_z=(n_{z1}d_1+n_{z2}d_2)/(d_1+d_2)$$

Furthermore, the relational expression described in the following formula (Formula 11) can be derived from Formula 8 and Formula 9, and the relational expression described in the following formula (Formula 12) can be derived from Formula 10.

$$\begin{aligned}(N_p - N_s)(d_1 + d_2) &= (n_{p1}d_1 + n_{s2}d_2) - (n_{s1}d_1 + n_{p2}d_2) \\ &= (n_{p1} - n_{s1})d_1 - (n_{p2} - n_{s2})d_2 \\ &= 605 \text{ nm} - 465 \text{ nm} \\ &= 140 \text{ nm} \end{aligned} \quad \text{Formula 11}$$

$$\begin{aligned}(N_z - N_s)(d_1 + d_2) &= (n_{z1} - n_{s1})d_1 - (n_{p2} - n_{z2})d_2 \\ &= 0 - \{(n_{p2} - n_{s2})d_2 - (n_{z2} - n_{s2})d_2\} \\ &= 0 - (465 - 535) \\ &= 70 \text{ nm} \end{aligned} \quad \text{Formula 12}$$

In addition, the following relational expression (Formula 13) follows from Formulas 11 and 12 mentioned above.

Formula 13

$$N_z=(N_p+N_s)/2$$

The above-mentioned Formula 13 is the same relational expression as Formula 4 mentioned above, which indicates that the incident angle dependency of retardation is minimized. In other words, this laminated retardation film is useful as the retardation film for the liquid crystal display element of this invention.

In this embodiment, the retardation of the laminated retardation film is determined to be $\lambda/4$, but when the laminated retardation film is used for liquid crystal display elements other than that of this invention, it is possible to obtain a laminated retardation film with a wavelength dependency of retardation and an incident angle dependency compensated by designing one of the retardation films such that the condition in which $\lambda/8$ in the above-mentioned Formula 7 is replaced with $\phi/2$ /2 ($\phi$ is retardation) is satisfied.

Also in this embodiment, polypropylene and polycarbonate are used as materials for the laminated retardation film, but it is not necessarily restricted to this configuration only. It is also possible to use polyvinyl alcohol as one of the two kinds of materials comprising the laminated retardation film with small wavelength dependency of refraction index.

As mentioned above, the liquid crystal display element of this invention combines a retardation film for compensation of angle of visibility, which was used in the birefringence mode of the STN, with reflective guest host liquid crystals using a quarter wavelength plate, which conventionally suffered from extremely low contrast. Accordingly, all the problems in the conventional reflective liquid crystals were solved, and a liquid crystal display element having brightness, very high contrast, simplicity in gradation display, and low driving voltage is attained. Furthermore, the retardation film of the invention can compensate both the incident angle dependency and the wavelength dependency of the quarter wavelength plate, and by using this retardation film for the liquid crystal display element of this invention, the display performance can be improved even more.

Furthermore, it was difficult in the past to perform matrix driving in the guest host LC mode, since the guest host liquid crystals were homogeneously aligned or twisted at more than 360° such as the phase change guest host LC. However, as in this embodiment, when the guest host liquid crystals are configured as a twisted nematic structure of less than 250°, and when a twist pitch of this twisted nematic structure is determined to be larger than the Mauguin's limit, and by combining it with a retardation film with an incident angle dependency being compensated, a display with high contrast can be attained by simple matrix driving.

When an active driving element is added to the liquid crystal cell of this invention for driving a large number of pixels, and by using a microcolor filter with high transmissivity, a color display of the reflective-type can be obtained. However, with regard to the liquid crystal display element of this invention, since the retardation film and the reflection plate are disposed under the liquid crystal layer, a double image appears when the distance between the liquid crystal layer and the retardation film, the reflection plate is too large. Therefore, the ideal configuration would be to install the retardation film and the reflection plate inside the liquid crystal panel. When the retardation film and the reflection plate are disposed outside the liquid crystal panel, it is desirable to use a substrate which is as thin as possible, such as a plastic film substrate, to insert between the liquid crystal layer and the retardation film. As a result, even if the pixel pitch is fine, the problem of double image can be mostly solved.

The invention may be embodied in other forms without departing from the spirit or essential characteristics thereof.

The embodiments disclosed in this application are to be considered in all respects as illustrative and not as restrictive. The scope of the invention is indicated by the appended claims rather than by the foregoing description, and all changes which come within the meaning and range of equivalency of the claims are intended to be embraced therein.

What is claimed is:

1. A liquid crystal display element comprising at least one liquid crystal layer comprised of guest host liquid crystals sandwiched between electrodes facing each other via an alignment film, a retardation film disposed under said liquid crystal layer, and a reflection plate disposed under said retardation film, wherein at the time polarized light passing through said liquid crystal layer enters said retardation film and is reflected by said reflection plate and is radiated back to said retardation film, retardation of said retardation film is determined such that relative retardation of said polarized light shifts at 180°, and a principal refraction index $n_z$ in the thickness direction z of said retardation film is determined to be a value obtained in the middle of two principal refraction indexes x and y inside the plane.

2. The liquid crystal display element as in claim 1, wherein the retardation of the retardation film is about a quarter wavelength against light having a wavelength of 550 nm.

3. The liquid crystal display element as in claim 1, wherein the alignment film comprises a vertically alignment film, and the guest host liquid crystals are made by mixing a dichroic dye to nematic liquid crystals with negative dielectric anisotropy.

4. The liquid crystal display element as in claim 1, wherein the guest host liquid crystals have a twisted nematic structure of 180° to 250°, and a twist pitch of said twisted nematic structure is larger than Mauguin's limit.

5. The liquid crystal display element as in claim 4, wherein the retardation film is a quarter wavelength plate, and birefringence of said retardation film has its principal axis in the direction forming an angle of 30° to 60° with an aligned direction of a liquid crystal molecule closest to said retardation film of the liquid crystal layer.

6. The liquid crystal display element as in claim 1, wherein the retardation film comprises a material having a smaller wavelength dispersion of retardation than polycarbonate.

7. The liquid crystal display element as in claim 6, wherein the retardation film comprises polyvinyl alcohol.

8. A laminated retardation film being formed by joining a retardation film A having small wavelength dependency of refraction index on a retardation film B having large wavelength dependency of refraction index and smaller retardation than said retardation film A such that a slow axis $x_2$ of said retardation film B is approximately perpendicular to a slow axis $x_1$ of said retardation film A, wherein a refraction index $n_{zB}$ in the thickness direction $z_2$ of said retardation film B is determined to be larger than a refraction index $n_{pB}$ in the slow axis $x_2$ direction.

9. The laminated retardation film as in claim 8, wherein a product $(n_{zB}-n_{pB}) \times d_B$ of a difference between the refraction index $n_{zB}$ in the thickness direction $z_2$ and the refraction index $n_{pB}$ in the slow axis direction $X_2$ of the retardation film B, and a thickness $d_B$ of the retardation film B is about half the retardation of the laminated retardation film.

10. The laminated retardation film as in claim 9, wherein the retardation film A is comprised of polypropylene or polyvinyl alcohol, and the retardation film B is composed of polycarbonate.

11. The liquid crystal display element as in claim 1, wherein the retardation film comprises a laminated retardation film being formed by joining a retardation film A having small wavelength dependency of refraction index on a retardation film B having large wavelength dependency of refraction index and smaller retardation than said retardation film A such that a slow axis $x_2$ of said retardation film B is approximately perpendicular to a slow axis $x_1$ of said retardation film A, wherein a refraction index $n_{zB}$ in the thickness direction $z_2$ of said retardation film B is determined to be larger than a refraction index $n_{pB}$ in the slow axis direction $x_2$.

\* \* \* \* \*